United States Patent
Pangalila

(10) Patent No.: US 11,407,484 B2
(45) Date of Patent: Aug. 9, 2022

(54) STANDARD CABIN MONUMENT SUB-STRUCTURE

(71) Applicant: AIRBUS AMERICAS, INC., Herndon, VA (US)

(72) Inventor: Iwan Pangalila, Bristol (GB)

(73) Assignee: AIRBUS AMERICAS, INC., Herndon, VA (US)

(*) Notice: Subject to any disclaimer, the term of this patent is extended or adjusted under 35 U.S.C. 154(b) by 523 days.

(21) Appl. No.: 16/442,070

(22) Filed: Jun. 14, 2019

(65) Prior Publication Data

US 2020/0391867 A1 Dec. 17, 2020

(51) Int. Cl.
| | |
|---|---|
| *B64C 1/10* | (2006.01) |
| *B64D 11/02* | (2006.01) |
| *B64D 11/04* | (2006.01) |
| *B64D 11/00* | (2006.01) |

(52) U.S. Cl.
CPC ............. *B64C 1/10* (2013.01); *B64D 11/02* (2013.01); *B64D 11/04* (2013.01); *B64D 2011/0046* (2013.01)

(58) Field of Classification Search
CPC ......... B64D 11/02; B64D 11/04; B64D 11/00; B64D 2011/0046; B64C 1/06; B64C 1/10
See application file for complete search history.

(56) References Cited

U.S. PATENT DOCUMENTS

| | | | |
|---|---|---|---|
| 4,055,317 A | 10/1977 | Greiss | |
| 7,954,761 B2 | 6/2011 | Johnson et al. | |
| 8,403,266 B2 | 3/2013 | Fokken et al. | |
| 8,474,758 B2 | 7/2013 | Koefinger et al. | |
| 9,010,686 B2 | 4/2015 | Saint-Jalmes et al. | |
| 9,428,275 B2 | 8/2016 | Najd et al. | |
| 9,458,620 B2 | 10/2016 | Sevtsuk et al. | |
| 2006/0145442 A1* | 7/2006 | Van Loon | B64D 11/04 280/79.7 |
| 2011/0309194 A1* | 12/2011 | Pangalila | B64D 11/04 244/118.5 |
| 2012/0248245 A1 | 10/2012 | Schliwa | |

(Continued)

FOREIGN PATENT DOCUMENTS

| | | |
|---|---|---|
| EP | 2 184 231 | 5/2010 |
| EP | 2 727 822 | 5/2014 |

(Continued)

OTHER PUBLICATIONS

Extended European Search Report for European Application No. 20179403.9, nine pages, dated Nov. 6, 2020.

*Primary Examiner* — Richard R. Green
*Assistant Examiner* — Arfan Y. Sinaki
(74) *Attorney, Agent, or Firm* — Nixon & Vanderhye P.C.

(57) ABSTRACT

A sub-structure for an aircraft cabin monument is disclosed. The sub-structure includes a plurality of mounting attachment points for supporting a mount to engage with a corresponding mounting attachment point on a lattice structure of a load carrying partition wall. The aircraft cabin monument is supported by the load carrying partition wall through the sub-structure, supporting a substantial weight of the monument, and relieving the cabin floor from supporting the load and weight of the aircraft cabin monument.

10 Claims, 16 Drawing Sheets

(56) References Cited

U.S. PATENT DOCUMENTS

| | | | |
|---|---|---|---|
| 2014/0124622 A1* | 5/2014 | Boren | B64C 1/10 |
| | | | 244/118.5 |
| 2014/0367521 A1 | 12/2014 | Joern et al. | |
| 2018/0016010 A1* | 1/2018 | Benthien | B64D 11/04 |
| 2019/0389598 A1* | 12/2019 | Chua | B64C 1/34 |

FOREIGN PATENT DOCUMENTS

| | | |
|---|---|---|
| EP | 3 075 650 | 10/2016 |
| WO | 2004/071867 | 8/2004 |

* cited by examiner

STANDARD CABIN MONUMENT SUB-STRUCTURE

TECHNICAL FIELD

The disclosure is related to structures and partition walls for an aircraft cabin, and more specifically, to a frame or sub-structure for an aircraft cabin module for securing thereof to a load carrying partition wall attached to the aircraft fuselage.

BACKGROUND

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

Partition walls are used in an aircraft cabin area for separating different passenger area classes (e.g. First Class, Business Class, Economy Class). Adjoining a partition wall, an aircraft cabin monument or module attachment may be located, but not supported by the partition wall. The cabin monuments, such as, for example, a lavatory, a galley, or a cockpit door module, are conventionally attached to the aircraft cabin floor by attachments, for example, brackets, which may be counted as payload and add additional weight to the aircraft. In the airline industry, every airline has specific cabin area configuration and customization requests upon their purchase of an aircraft. Each design and customization of cabin galley monument or lavatory monument may require numerous brackets for attaching at various points, which in turn add weight to the aircraft.

Conventional monument attachments may require lower attachment points to the cabin floor and may require a number of hard points and flutter points. Heavy loads of cabin monuments are all carried by the aircraft cabin floor. This leads to heavy floor grid design and no effective use of the existing structures in the aircraft fuselage. However, in a broader sense, every cabin monument customization and design variation requires a separate certification, which is time consuming and expensive, and which may result in long lead times and expensive individual certification process. Therefore, there is a need for a way to reduce and eliminate the lengthy and expensive re-certification and approval process of every customized cabin and monument design by providing a standardized and uniform installation and mounting of the cabin monument. By changing the brackets and tie rods that are conventionally used for attaching the monuments to the cabin floor, and standardizing the attachments using a sub-structure within the monument and standard interfaces, will eliminate the hard points and tie rods, and the need for a re-certification of every monument design change and customization. The use of standard interfaces and zero bracket installation make it possible for automation and installation of the aircraft cabin monuments.

SUMMARY

The disclosure is embodied as an aircraft monument support sub-structure having a plurality of support bars or panels attached to the monument, a plurality of attachment mounts on the support bars, a plurality of fasteners each configured to attach the monument to a load carrying partition wall at a corresponding attachment mount, and wherein the monument is supported and attached to the load carrying wall by the support sub-structure.

The load carrying partition wall may include a lattice structure attached to a partition wall frame, wherein the partition wall frame is attached to the aircraft fuselage.

The monument support structure may include the plurality of the bars being integrally formed with the aircraft monument as a single component.

The monument support structure may include a plurality of the bars that are separate components attached to an inner portion of the aircraft monument.

The invention may be embodied as an aircraft having a fuselage bounding a cabin area therewithin, at least one load carrying partition wall comprising a partition wall frame and a lattice structure attached thereto, the lattice structure being formed from a plurality of support bars interconnected to one another, a cabin monument, a support structure mounted within the cabin monument, wherein the support structure is attached to the lattice structure for supporting the aircraft cabin monument to the at least one load carrying partition wall and supporting a substantial weight of the cabin monument.

The invention contemplates mounting the monuments to the partition wall and not connecting and supporting them on the cabin floor. The invention may be embodied as a standardized load carrying structure for supporting the monuments, and the monuments including corresponding sub-structures integrally formed therein to support the customizable monuments, and the load carrying structure relieving the cabin floor from supporting the weight of the monuments. The standardized interface points as a result of having sub-structures provide for a standard master certification and approval because of the predetermined attachment points of the sub-structure to the load carrying structure and the partition wall. The standardized sub-structures of any galley or lavatory monument will require a standard full-scale test certification covering all possible Center of Gravity (CoG) points, which will allow for design customizations without the need for additional approval or re-certification of the designs.

The invention is also embodied as attaching the galley or lavatory monuments to a load carrying partition wall, in which their weight may be distributed to the upper fuselage and the frame.

The invention contemplates attaching the galley or lavatory monument to the load carrying wall using a frame or sub-structure integrally formed with the monument hence using standard interfaces and eliminating the need for brackets, hard points, and tie rods.

The invention also contemplates using the load carrying wall and sub-structures as standard interfaces for mounting monument galleys and lavatories without the need for any brackets.

The galley and lavatory monuments may include the sub-structure as integrally formed one piece component. The sub-structure maybe separate bars, rods, components, attached to one another one end to the other end, or may be integrally formed with the monument peripheral wall, or may be of the same bar structure as the lattice component. The sub-structure may be formed of metal, fiber composite, secured to one another by welding, glue, rivets, or screws.

The substructure will be combined with the load carrying wall and the partition itself. The partition is only to reinforce the frame location and to distribute the load to the frame instead of the floor. The sub-structure is to make it possible to give the customer more flexibility to have more configurations of the galley or lavatory monuments for customization. The sub-structure is related to the design of the galley monument and, for example, the number of ovens or microwaves, which conventionally requires an additional certification and re-certification.

BRIEF DESCRIPTION OF THE DRAWINGS

For an understanding of embodiments of the disclosure, reference is now made to the following description taken in conjunction with the accompanying drawings, in which.

DETAIL DESCRIPTION OF SOME EMBODIMENTS

Some embodiments will now be described with reference to the Figures, like numerals being used to refer to like and corresponding parts of the various drawings.

Figure 1:
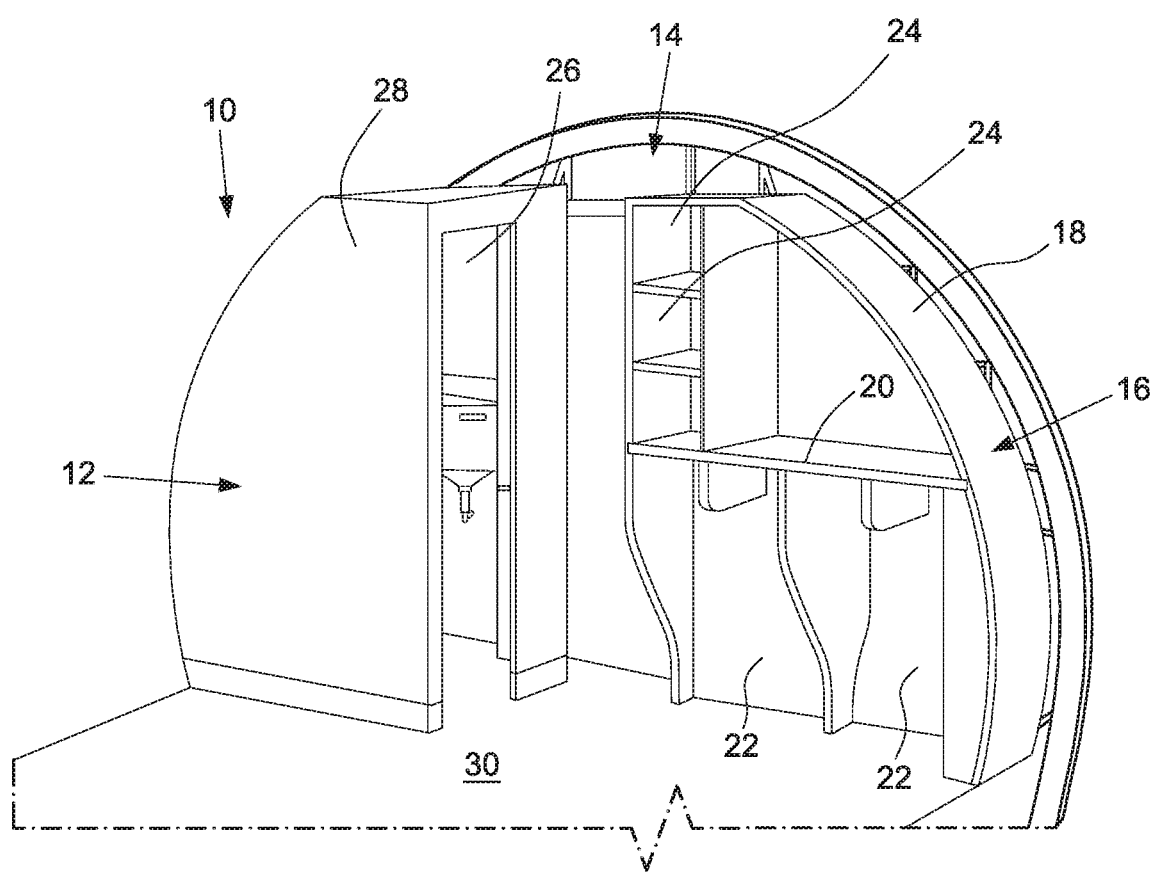
FIG. 1 is a perspective view of an aircraft cabin interior illustrating monuments mounted onto a load carrying partition wall.

Referring now to FIG. 1, the interior of an aircraft cabin is generally shown at 10 illustrating an exemplary single-aisle commercial aircraft. A lavatory monument 12 is illustrated in a mounted configuration at a rear end thereof to a load carrying partition wall 14, and a galley monument 16 spaced apart and adjacent to the lavatory monument 12 mounted at a rear end thereof to the load carrying partition wall 14 forming a passage therebetween. This is an exemplary embodiment of a customized design and configuration of not only having a single lavatory monument 12 and a single galley monument 16, but the galley monument 16 itself has customized configurations as to, for example, the number of food trolleys or carts, and upper shelves. As will be explained in greater detail, standardizing the load carrying partition wall and attachment points thereon, together with a sub-structure for mounting the galley monument 16 and the lavatory monument 12 with consideration for a standard full-scale test certification that will cover all possible Center of Gravity (CoG) points, which will allow any redesign and customization of the monuments without requiring the lengthy recertification process.

For example, in this embodiment, the galley monument 16 includes an arcuate outer panel 18, which conforms to the shape of the aircraft fuselage, with holding spaces having a lateral shelf 20 providing for four adjoining food trolley or cart spaces 22 therebelow the lateral shelf 20, and a plurality of shelves 24 above the lateral shelf 20. Now, any other changes in this customization and configuration of the galley monument 16 would conventionally require a separate certification as, for example, by adding a location and a component such as a microwave or oven having a different center of gravity, which will result in having a different mounting points of the monument. However, utilizing the current invention requiring to attach the monument galley 16 to the load carrying partition wall 14 using a sub-structure, and standardizing the mounting and attachment points will eliminate the need to any re-certification requirement yet allowing the aircraft manufacturers to customize the configuration of monument galleys and lavatories in numerous different ways.

In this embodiment, the same customization requirement may be that the lavatory monument 12 is embodied as a single lavatory having a side door 26 in facing relation to the galley monument 16, and any other customization and changes in the configuration of the lavatory monument 12 may also be accommodated without requiring any re-certification by virtue of having the sub-structure to attach lavatory monument 12 to the load carrying partition wall 14. The lavatory monument 12 includes a front decorative wall or panel 28, and both the lavatory monument 12 and the galley monument 16 are mounted and supported by the load carrying partition wall 14, which will reduce the weight of either monument being exerted on the cabin floor 30.

This is a customized configuration which may require the galley monument 16 to have, for example, a place for two separate food trolleys placed in spaces 22, and the shelf 20 with customized space above it. As will be explained in greater detail, by virtue having a standard sub-structure or frame built within the galley or lavatory monuments for mounting and installation onto the load carrying partition wall, any lengthy approval and re-certification process can be eliminated. A single certification of the load carrying partition wall will only be required, and because different interface mounting points for difference components of the equipment installed within the monument galley can be calculated, the mounting and installation can be standardized and will require less time than conventionally done. That is, one the load carrying partition wall and standard interfaces are certified, no additional re-certification may be required as a result of changes in the configurations of the monuments that will move the center of gravity.

Figure 2:
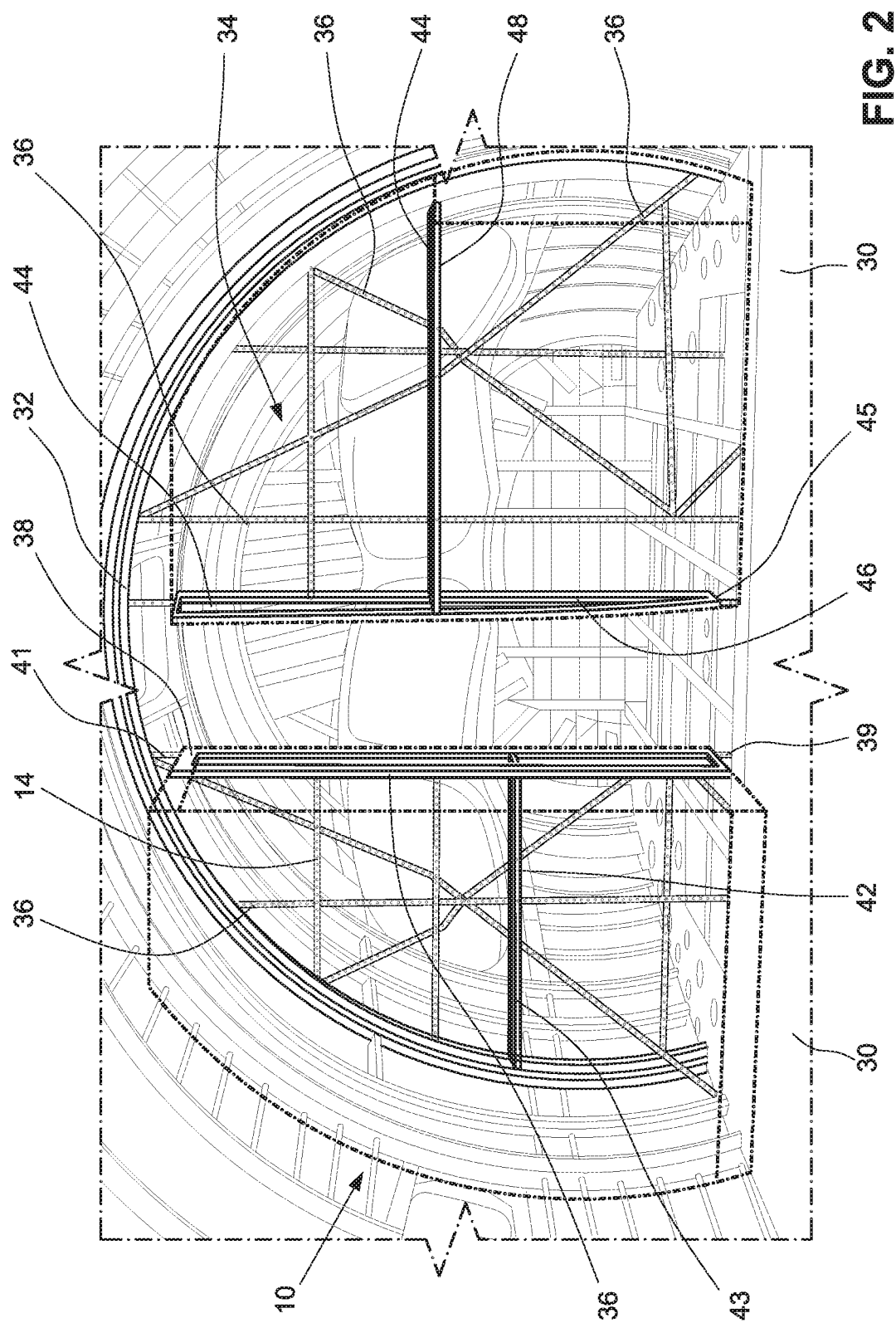
FIG. 2 is a perspective view of the load carrying partition wall and a sub-structure installed within the monuments of FIG. 1.

Referring now to FIG. 2, the front decorative wall 28 and panels of the lavatory monument 12, and the shelves and the panels of the galley monument 16 have been removed to illustrate the structural support and frame mechanism. The load carrying partition wall 14 may include a partition wall frame 32 conforming to the arcuate shape of aircraft fuselage extending from the cabin floor 30 at opposing ends thereof. The load carrying partition wall 14 is shown having a lattice structure 34 formed from a plurality of supporting bars 36 interconnected to one another end-to-end. Underlying the present disclosure is the recognition by the inventor that the re-certification of the any monument design and customization can be eliminated by virtue of having a standardized mounting of the a cabin monument using a sub-structure 38 or frame which may be integrally formed with the monument, or as a separate component attached thereto, providing for a mounting frame of the cabin monument to varying attachments points on the lattice structure 34.

The lavatory monument 12 and the galley monument 16 are attached to the lattice structure 34 by connectors at the specific connection points. This will allow for the substantial weight of the monuments to be supported by the load carrying partition wall 14, and the weight and loads transferred to the fuselage frame and the frame of the partition wall 32 rather than being supported by the cabin floor 30. The load carrying lattice structure 34 has a shared functional component for both the structure and aircraft cabin.

Figure 3:
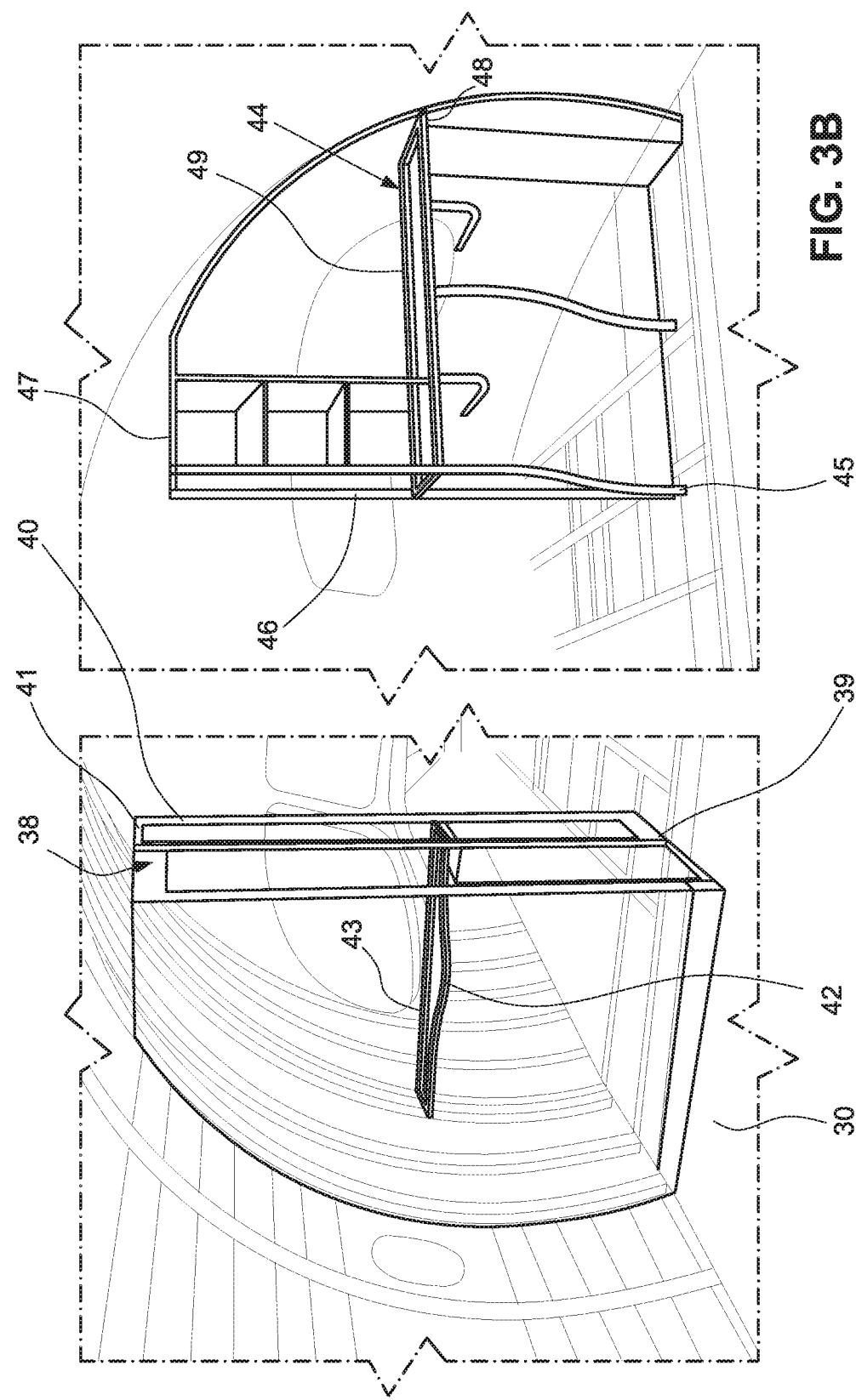
FIG. 3A is an exemplary embodiment of a sub-structure for a lavatory monument.
FIG. 3B is an exemplary embodiment of a sub-structure for a galley monument.

Referring to FIGS. 2 and 3A, a standard support frame or sub-structure 38 for the lavatory monument 12 is illustrated. The sub-structure 38 has an optimized load path from the lavatory monument 12 to the aircraft fuselage through the sub-structure 38 and standardized connecting attachment points. It is noted that instead of the lavatory sub-structure 38, the sub-structure may be utilized for other modules or load carrying components in an aircraft such as, but not limited to, a cockpit door module frame, emergency equipment, baby bassinets, and observer seats. The sub-structure may have a standard geometry and interfaces which will be explained in greater detail in reference to the lavatory and galley monuments hereinbelow.

The lavatory sub-structure 38 may be integrally formed within the lavatory walls and panels, or be separate structural component attached to the various parts of the lavatory monument 12. The lavatory sub-structure 38 may include a rectangular side frame 40 vertically extending perpendicular relative to the cabin floor 30 on a bottom portion 39 of the lavatory monument 12 to a top portion 41 of the lavatory monument 12, and perpendicularly extending from the lattice structure 34 and built inside the side wall of the lavatory monument. The lavatory sub-structure 38 may include additional bars, frame, and support members each having an attachment point to the secure to the corresponding mounting point on the lattice structure bars. The lavatory sub-structure 38 may also include a substantially horizontal frame 42, which is positioned and configured horizontally relative to and above the cabin floor 30 at a mid-point section of the lavatory and extending perpendicularly from the rectangular side frame 40 at one end. The substantially horizontal frame 42 may include a plurality of attachment points along a longer side 43 thereof to attach to a corresponding mounting points on the corresponding bar for the lattice structure 34.

As stated hereinabove, the decorative walls and the doors have been removed to illustrate the lavatory sub-structure 38 in greater detail. Also, as will be explained herein, standard plug-in connections for quick and easy installation of the lavatory monument 12 and the galley monument 16 through the lavatory sub-structure 38 to a corresponding attachment point on the lattice structure 34 may be used for quick and easy installation.

Referring to FIG. 2 and FIG. 3B, a sub-structure 44 for the galley monument 16 is illustrated, and similar to that of the sub-structure 38 for the lavatory monument 12, the sub-structure 44 may include a side frame 40 vertically extending perpendicular relative to the cabin floor 30 on a bottom portion 45 of the galley monument 16 to a top portion 47 of the galley monument 16, and substantially perpendicularly extending from the lattice structure 34 and built inside the side wall of the galley monument 16. The galley sub-structure 44 may include additional bars, frames, and support members each having an attachment point to the secure to the corresponding mounting point on the lattice structure bars. The galley sub-structure 44 may also include a substantially horizontal frame 48, which is positioned and configured horizontally relative to and above the cabin floor 30 at a mid-point section of the galley monument and extending perpendicularly from the rectangular side frame 46 at one end. The substantially horizontal frame 48 may include a plurality of attachment points along its longer side 49 thereof to attach to a corresponding mounting points on the corresponding bar for the lattice structure 34.

The galley monument is illustrated without decorative panels in its skeletal structure, wherein the customization can take place. As stated hereinabove by attaching the galley monument 16 to the load carrying partition wall 14, the loads of upper part of the galley monument may be distributed to the load carrying wall and the upper part of the aircraft fuselage, whereas the only the weight of the food trolleys are supported on the cabin floor 30.

The sub-structures for both the lavatory and galley monuments provide a standard connection that may allow for a generic certification of any monument customization and configuration. The sub-structures may be integrally formed within a part of the monument as a skeletal supporting feature, or be of separate components attached to the panels or parts of the monument. In designing the monument, all the positions of center of gravities are already defined based on the customization, and the airline customer may purchase the part with all the various customization. The sub-structure may, for example, cover the entire of the wall of the monument and the shape of the sub-structure may be defined by making the calculations of center of gravity.

Figure 4:
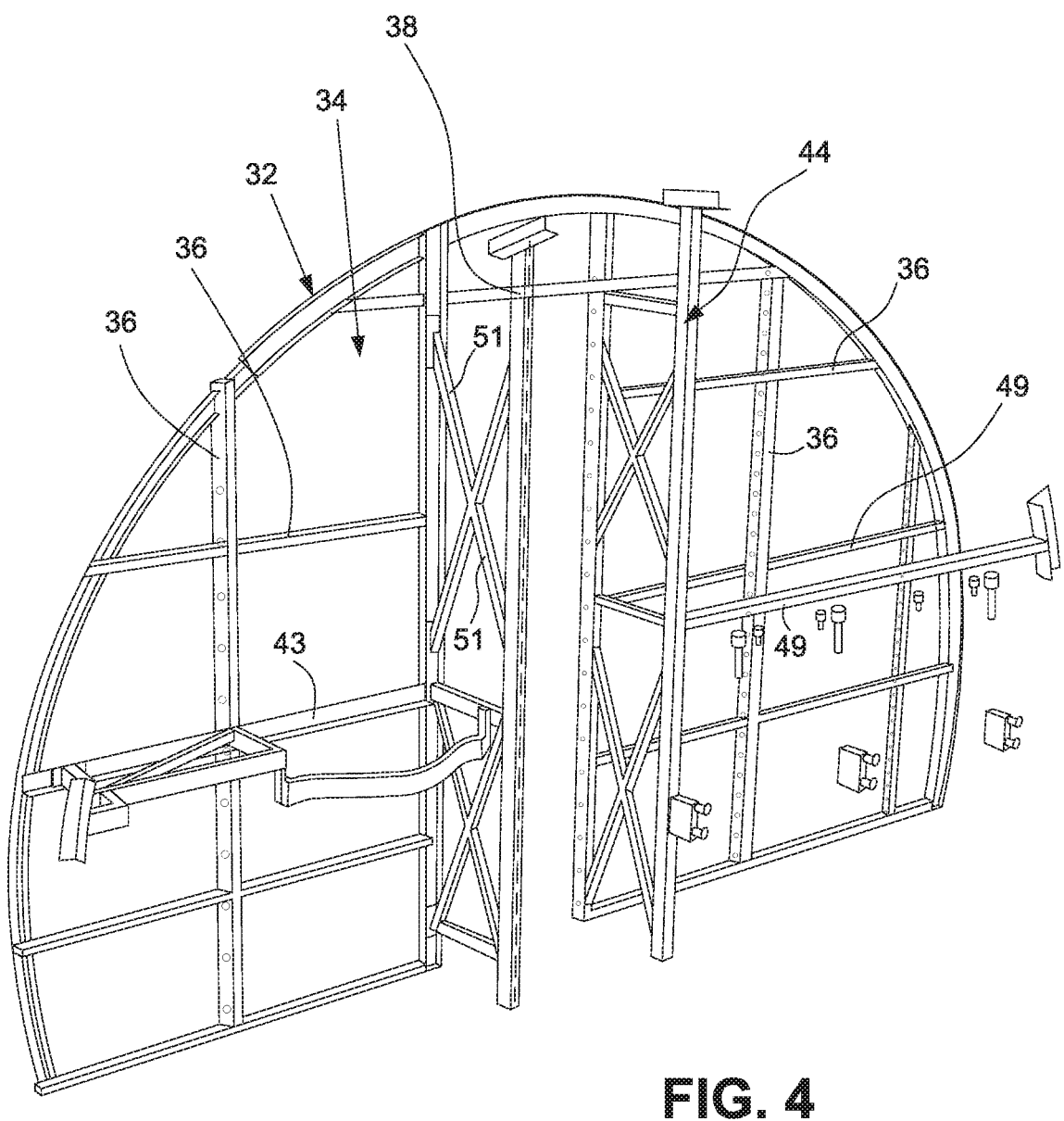
FIG. 4 is an exemplary embodiment of a load carrying partition wall lattice structure with the sub-structures attached thereto without the monuments.

Referring to FIG. 4, the partition wall frame 32 is shown with the lavatory sub-structure 38 and the galley sub-structure 44 without any of the decorative panels in a mounted and installed configuration. In this embodiment, the lavatory sub-structure 38 may include a plurality of supporting cross bars 51 extending between a perpendicular bar and the lattice structure 34. The galley sub-structure 44 may also include a plurality of supporting cross bars 51 extending between a vertical bar and the lattice structure 34. The lavatory sub-structure 38 and the galley sub-structure 44 may include various forms, shapes, and configurations for providing a standardized connecting means which can accommodate any design customization requirements by having calculation of various attachment and mounting points, and implemented as a means for mounting the monuments, hence, the sub-structures may become part of the monuments allowing for any number of configurations and designs to be implemented.

As a non-limiting example, a load optimization setup for attaching the monuments and modules using the sub-structures and the load carrying partition wall 14 may allow the reduction of weight on the cabin floor 30 by about 350 kilograms for a lavatory, about 26 kilograms for a cabin door, about 400 kilograms for a lower galley, and about 300 kilograms for an upper galley.

Figure 5:
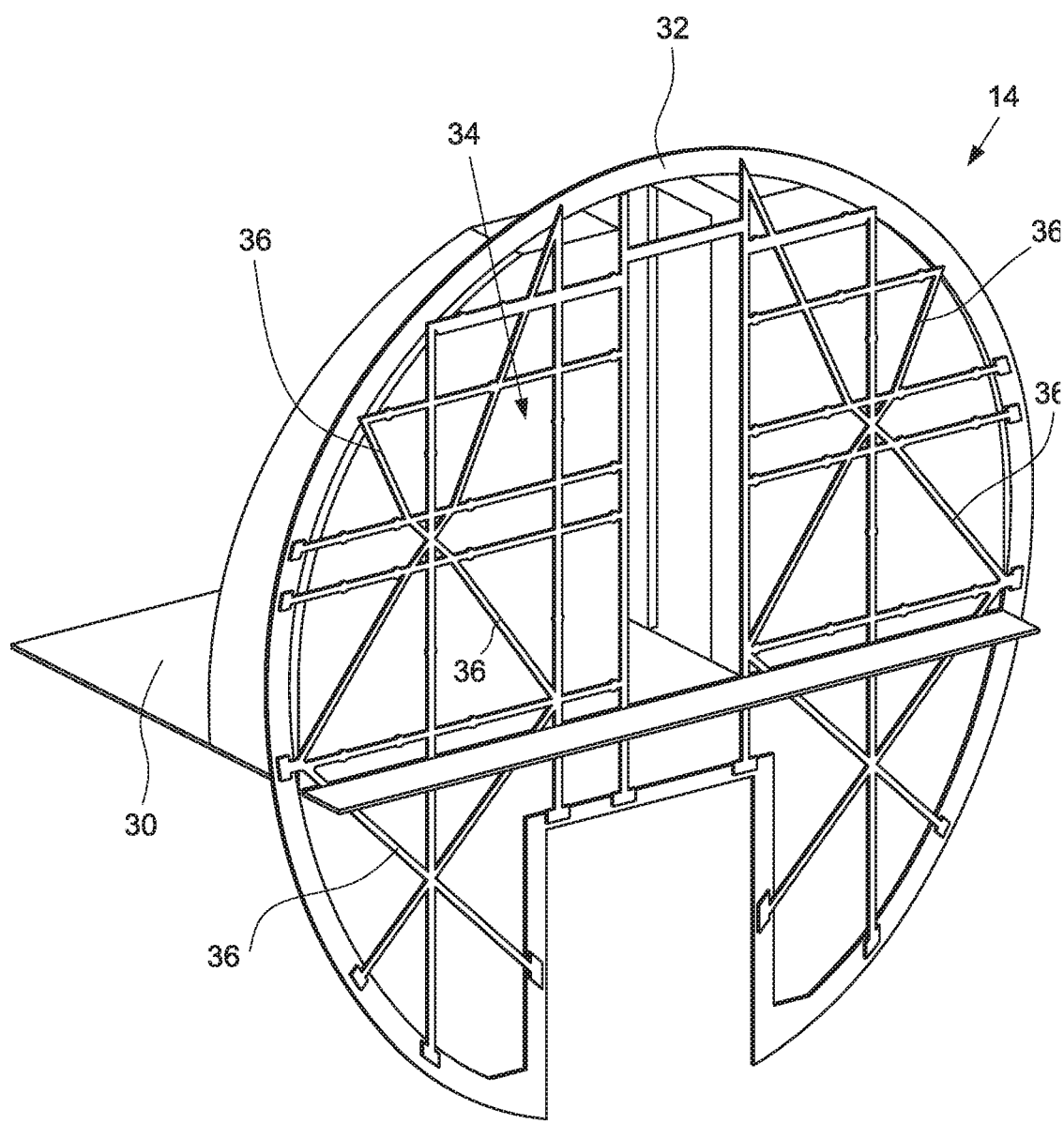
FIG. 5 illustrates an exemplary embodiment of the lattice structure for the load carrying partition wall.

Referring to FIG. 5, the exemplary partition wall 14 is illustrated. The load carrying partition wall 14 includes the lattice structure 34 comprising a plurality of supporting bars 36 interconnected to one another from end to end. The lattice structure 34 may have various shapes and configurations, and it transfers the weight loads of the galley and lavatory monuments attached thereto to the partition wall frame 32 around the load carrying partition wall 14, which in turn transfers the loads to the aircraft fuselage, relieving the cabin floor 30 from bearing the weight loads of the monuments. The partition wall frame 32 may be attached to a portion of the fuselage by a plurality of fasteners 37 such as but not limited to bolts, or rivets. The partition wall lattice structure supporting bars 36 may be formed of composite material or aluminum or other suitable material. The load carrying partition wall frame 32 may conform to and extend circumferentially around the inner surface of the fuselage in a portion above the cabin floor 30, and partially extending below the cabin floor 30 within the cargo area. Also, the cabin floor 30 may extend through the load carrying partition wall 14.

The lattice structure supporting bars 36 are attached to the partition wall frame 32 frame by fasteners, bolts, screws, or clips. The lattice structure 34 and the partition wall frame 32 may also be integrally formed as one piece. As previously noted, that the cabin floor 30 may also partially support some of the weight of the lavatory monument and the galley monument but the loads from the monuments are still substantially reduced to be transferred to the floor and are diverted to the fuselage.

Figure 6:
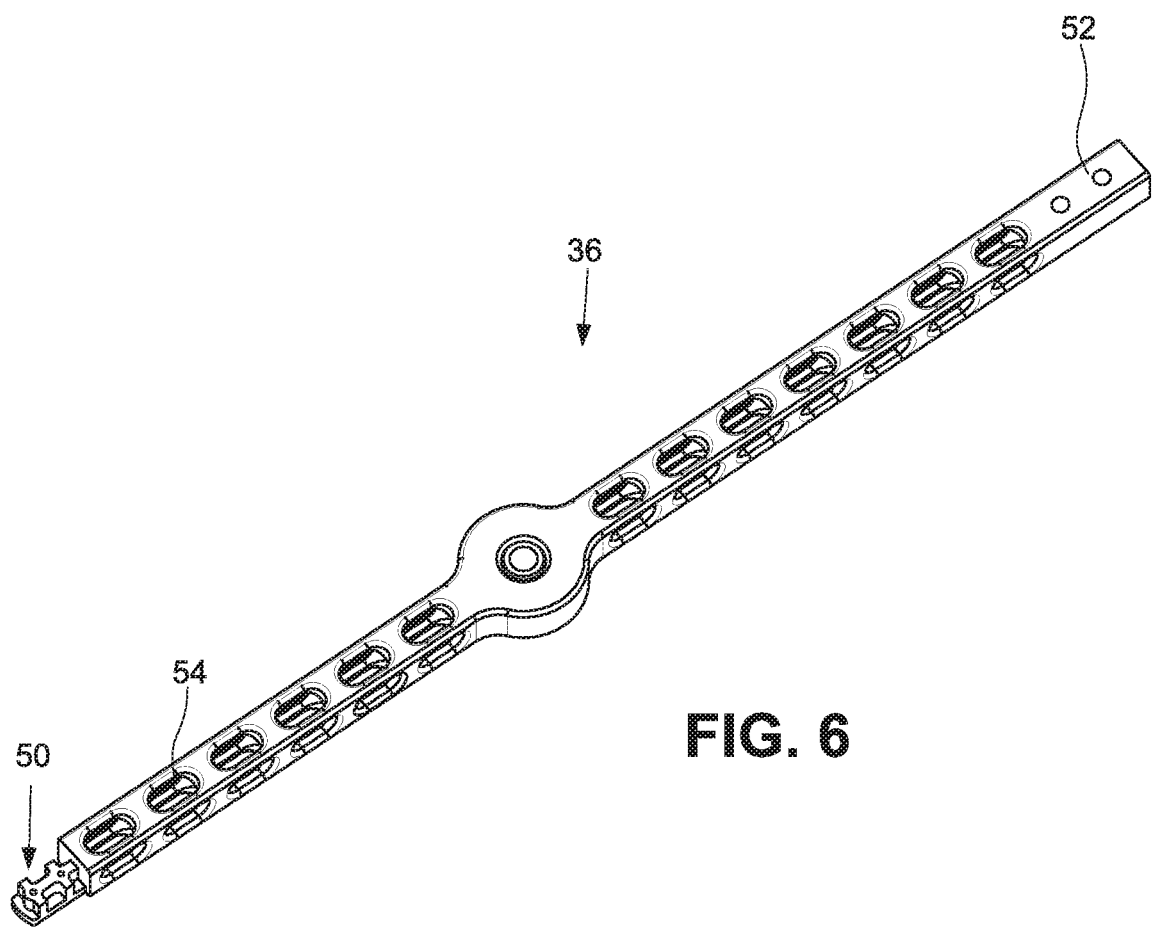
FIG. 6 is a perspective view of an exemplary support bar that forms the lattice structure.
Figure 7:
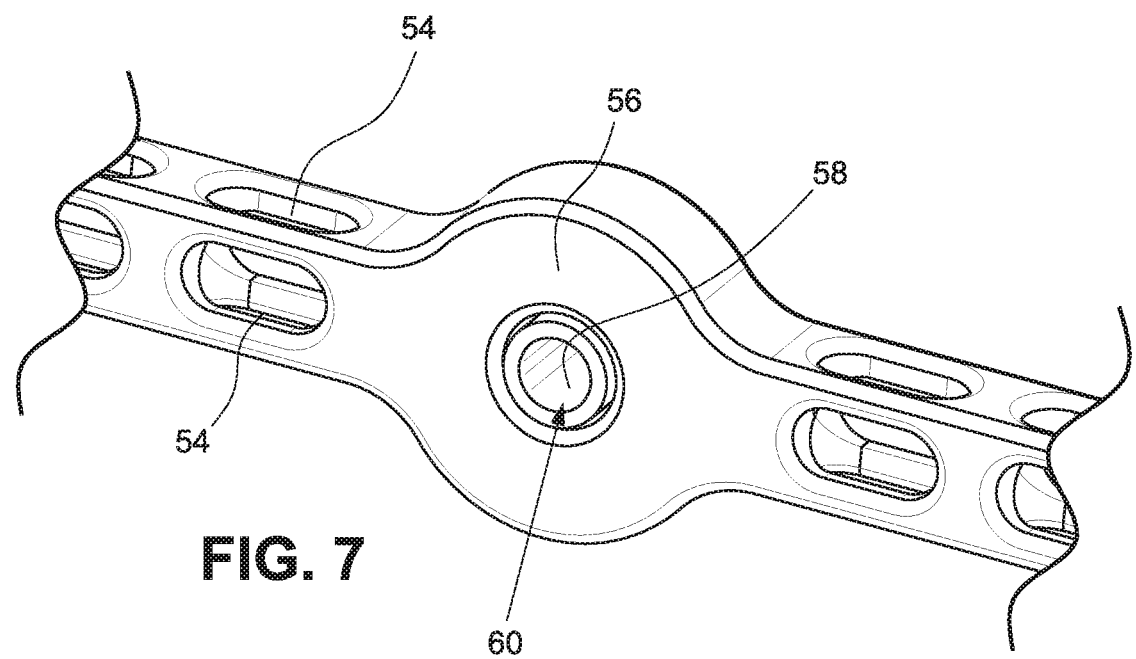
FIG. 7 is an enlarged perspective view of an attachment point in the support bar shown in FIG. 6.

Referring to FIGS. 6 and 7, the lattice structure 34 is formed of the plurality of supporting bars 36 shown having a substantially elongated rectangular cross section, although other shapes and configuration are contemplated to be within the scope of the disclosure. The supporting bars 36 may be manufactured by Additive Layer Manufacturing (ALM) or 3-D Printing. The supporting bars 36 may be made of composite material, metallic, aluminum, or other suitable material for supporting the weight and structure. There are numerous weight calculations and configurations as to how the supporting bars 36 are interconnected with one another with the underlying purpose being to consider the weight load of the lavatory monument 12 and the galley monument 16 being transferred to the loading carrying partition wall 14. The weight considerations may allow for determining the shape, configuration, size, and weight of each supporting bar 36.

Each supporting bar 36 may have first mating interlocking end 50, a second mating interlocking end 52 at an opposing end of the first mating interlocking end 50, and a plurality of apertures 54 extending along and on each side of the longitudinal supporting bar 36 for reducing the weight of each supporting bar 36. The supporting bars 36 are connected to one another end-to-end with the first mating interlocking end 50 of one supporting bar removably attached to the corresponding second mating interlocking end 52 of an adjoining supporting bar 36. Each supporting bar 36 may include a middle portion 56 having an aperture 58 therethrough for supporting a hollow washer 60 and other fastening means for securing the supporting bar 36 and the lattice structure 34 with a pin or other fastening means to the corresponding sub-structure mounting point on the lavatory or galley monument sub-structure. The fastener may be threaded and extends to the corresponding attachment point on the sub-structure of the monument.

Figure 8:
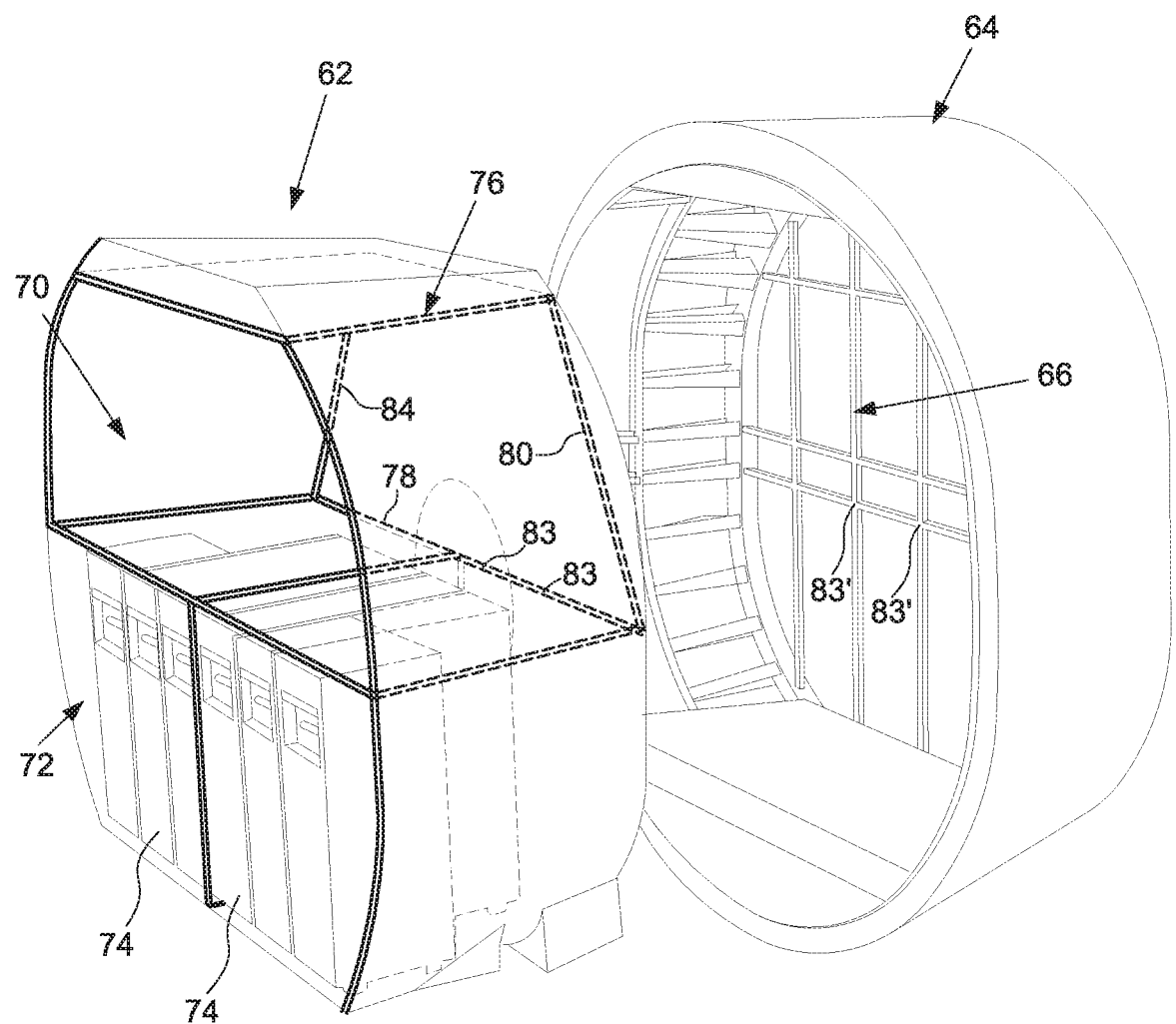
FIG. 8 is a perspective view of a single galley monument prepatory to installation to a partition wall within an aircraft fuselage.

Referring to FIG. 8, an exemplary single galley monument 62 is illustrated for mounting at an aft portion of the aircraft fuselage 64 where there is no aisle passage therethrough, and where the bulkhead separates the pressurized cabin section from the unpressurized section. In this embodiment, a lattice structure 66 comprising a plurality of supporting bars 68 interconnected with one another or integrally formed as one piece attached or mounted to be secured to the aircraft fuselage. The single galley monument 62 is customized and designed to have an upper galley portion 70 and a lower galley portion 72 for housing and bounding, for example, six food trolleys or carts 74. It is noted that the food trolleys 74 each have a standard height. The single galley monument 62 includes a sub-structure 76 mounted within the galley monument 62 or integrally formed with the side panels. For example, the sub-structure 76 may include a first post 78, a second post 80, and a third post each having specific attachment points 83 calculated as a result of the specific customization of galley. The lattice structure 66 may include a plurality of corresponding attachment points 83' which will correspond to the attachment points 83 on the sub-structure 76, for an efficient and standardized attachment of the monument to the lattice structure. Moreover, in this embodiment, an increase in the interior cabin space and, for example, an increase in the number of seat rows may be possible in the aft section of the aircraft as the curved pressure bulk head may be replaced by a flat pressure bulkhead.

Also, once the position of the vertical and horizontal panels in the galley monument design and customization are defined, the load paths and position of the attachment points 83, 83' will be based on only analysis and calculations, which will result in a simpler and standardized mounting, without requiring any further approval and re-certification. The height of the horizontal panel is always the same because it is based on the height of the trolleys as being of standard height. There is a use of standard sub-structures and standard connections for every design. Every galley may have a different weight or different center of gravity, but by using the standard sub-structure and standard connection, the time and cost and the re-certification requirement will be reduced.

Figure 9:
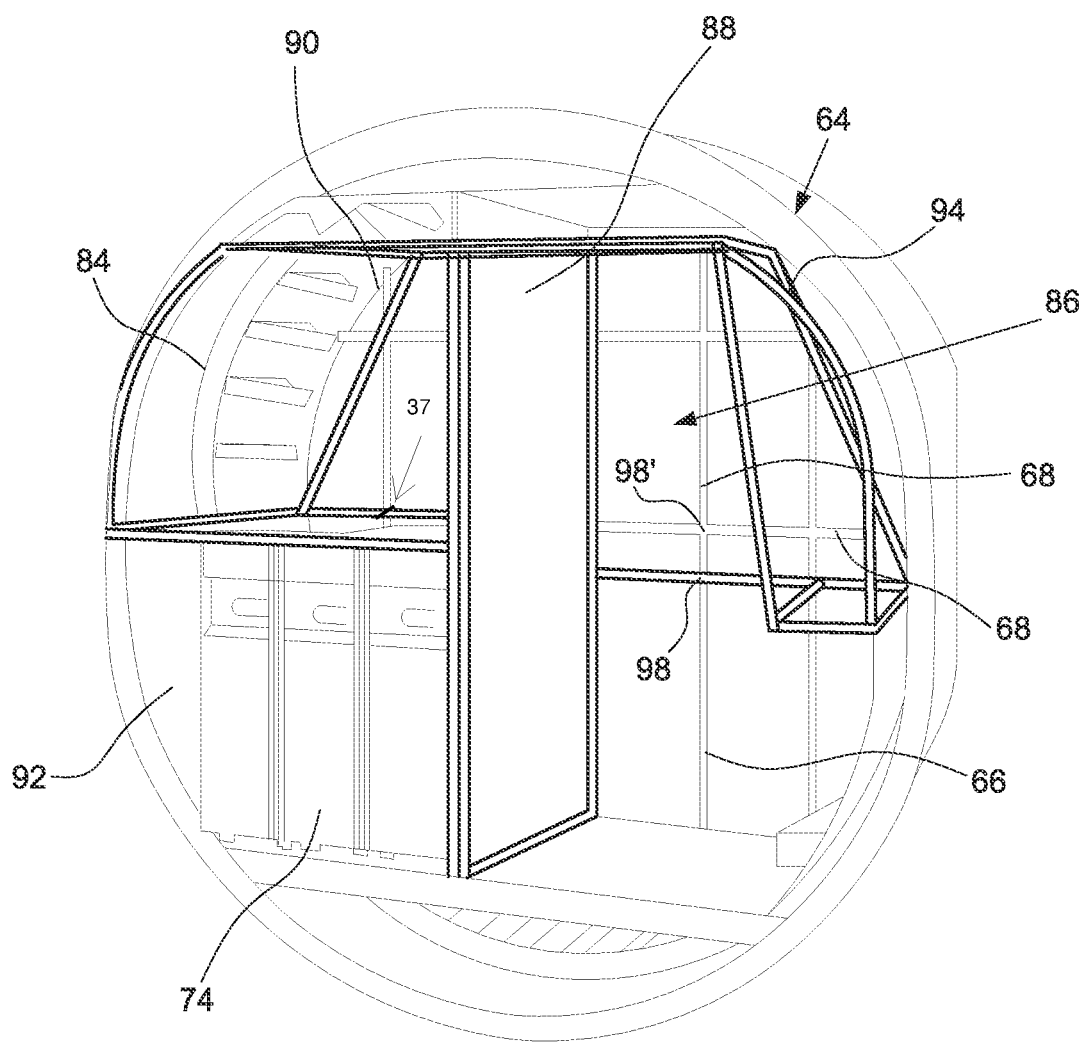
FIG. 9 is a perspective view of a sub-structure for a single galley monument and a single lavatory monument configuration.

Referring to FIG. 9, an exemplary embodiment showing a configuration of a single galley monument 84, a single lavatory monument 86 separated by a vertical panel 88, for mounting at an aft portion of the aircraft fuselage 64 where there is no aisle passage therethrough, and where the bulkhead separates the pressurized cabin section from the unpressurized section. Similarly to that of the embodiment of FIG. 8, the lattice structure 66 comprising a plurality of supporting bars 68 are interconnected with one another or integrally formed as one piece attached or mounted to be secured to the aircraft fuselage. The single galley monument 84 is customized and designed to have an upper galley portion 90 and a lower galley portion 92 for housing and bounding, for example, three food trolleys or carts 74. It is noted that the food trolleys 74 each have a standard height. The single galley monument 84 includes a sub-structure 94 mounted within the galley monument 84 or integrally formed with the side panels. For example, the sub-structure 94 may include a plurality of posts each having specific attachment points 98 calculated as a result of the specific customization of galley. The lattice structure may include a plurality of corresponding attachment points 98' which will correspond to the attachment points 98 on the sub-structure 94, for an efficient and standardized attachment of the monument to the lattice structure. The vertical panel 88 between the two galley and the lavatory may have a standard height extending to the top of the fuselage and at the bottom to the floor of the of the aircraft cabin floor. In this embodiment, the design variation as a result of standardization of the attachments and single certification of the load carrying partition wall and lattice structure, the sub-structures allow to have numerous design configurations without requiring re-certification. That is, anything that the airline customer requires, the calculations concerning the load diversity and center of gravity, and determining the mounting points may be done before they purchase the galleys.

Figure 10:
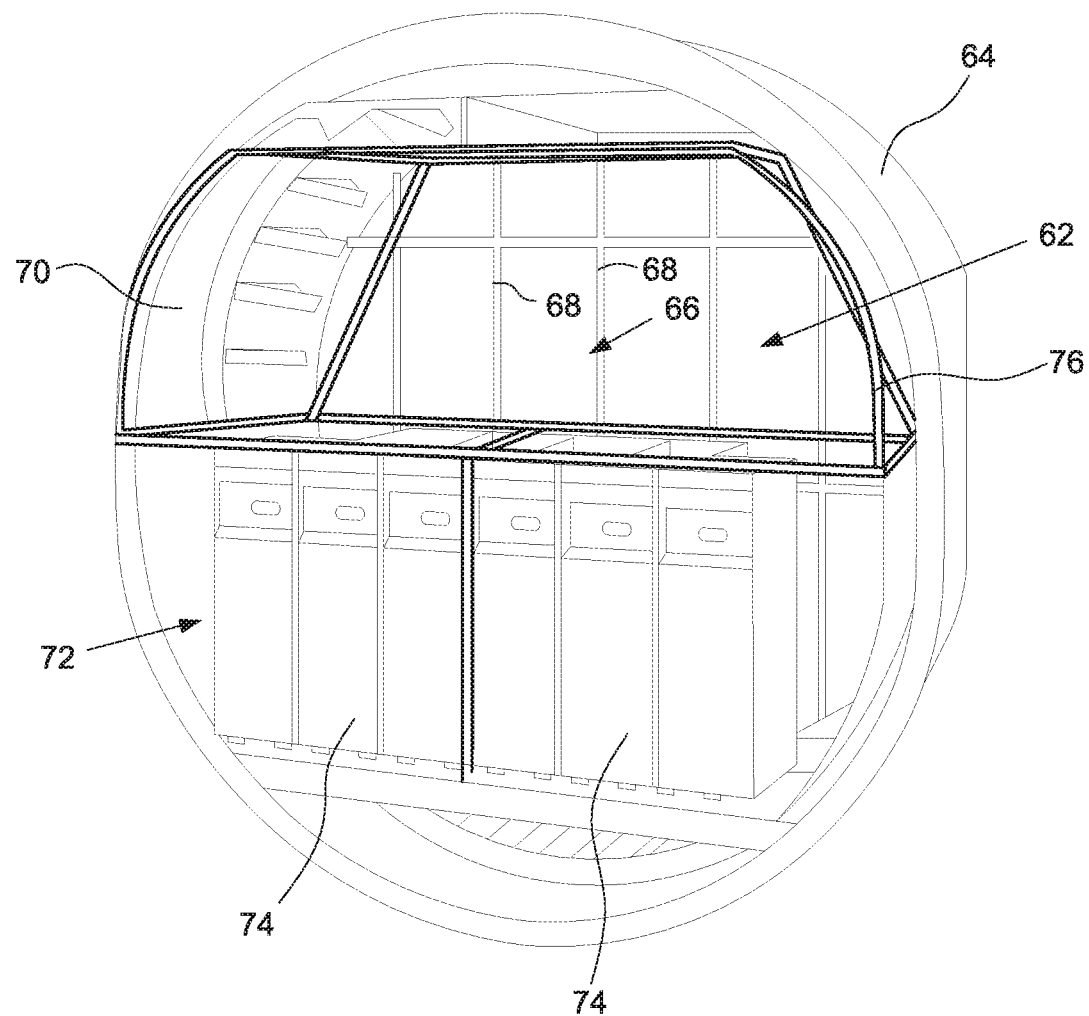
FIG. 10 is a perspective view of a sub-structure for a double galley monument configuration.

Referring to FIG. 10, similar to the embodiment shown in FIG. 8, an exemplary single galley monument 62 is illustrated for mounting at an aft portion of the aircraft fuselage 64 where there is no aisle passage therethrough, and where the bulkhead separates the pressurized cabin section from the unpressurized section. In this embodiment, a lattice structure 66 comprising a plurality of supporting bars 68 interconnection with one another or integrally formed as one piece is attached or mounted to be secured to the aircraft fuselage. The single galley monument 62 is customized and designed to have an upper galley portion 70 and a lower galley portion 72 for housing and bounding, for example, six food trolleys or carts 74. The single galley monument 62 includes a sub-structure 76 mounted within the galley monument 62 or integrally formed with the side panels. The sub-structure 76 may include a plurality of posts each having a specific attachment point, and the lattice structure may include a plurality of corresponding attachment points which will correspond to the attachment points on the sub-structure 76, for an efficient and standardized attachment of the monument to the lattice structure.

Figure 11:
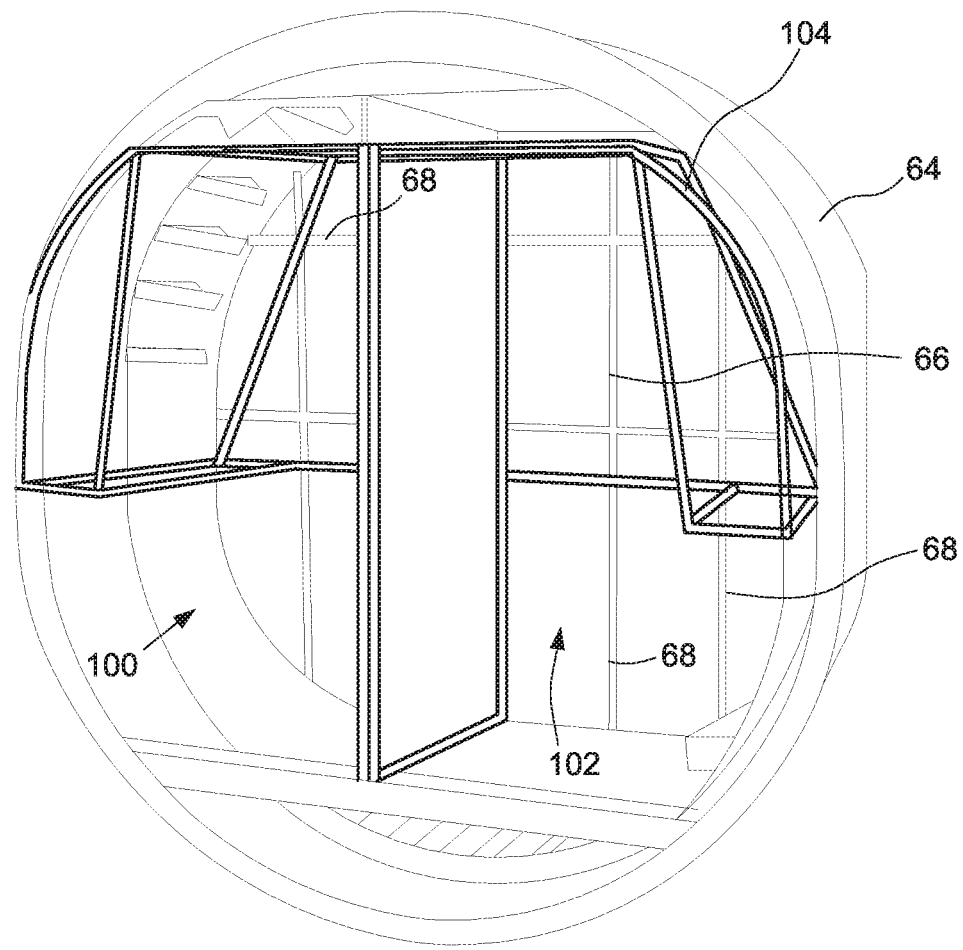
FIG. 11 is a perspective view of a sub-structure for a double lavatory monument configuration.

Referring to FIG. 11, this embodiment illustrates a customization of double lavatory monument configuration having a first lavatory monument 100 and a second lavatory monument 102 illustrated for mounting at an aft portion of the aircraft fuselage 64 where there is no aisle passage therethrough. A lattice structure 66 comprising a plurality of supporting bars 68 interconnected with one another or integrally formed as one piece is attached or mounted to be secured to the aircraft fuselage. The double lavatory monument includes a sub-structure 104 mounted within the double lavatory monument or integrally formed with the side panels. The sub-structure 104 may include a plurality of posts each having a specific attachment point calculated as a result of the specific customization of double lavatory monument. The lattice structure 66 may include a plurality of corresponding attachment points which will correspond to the attachment points on the sub-structure 104, for an efficient and standardized attachment of the monument to the lattice structure.

Figure 12:
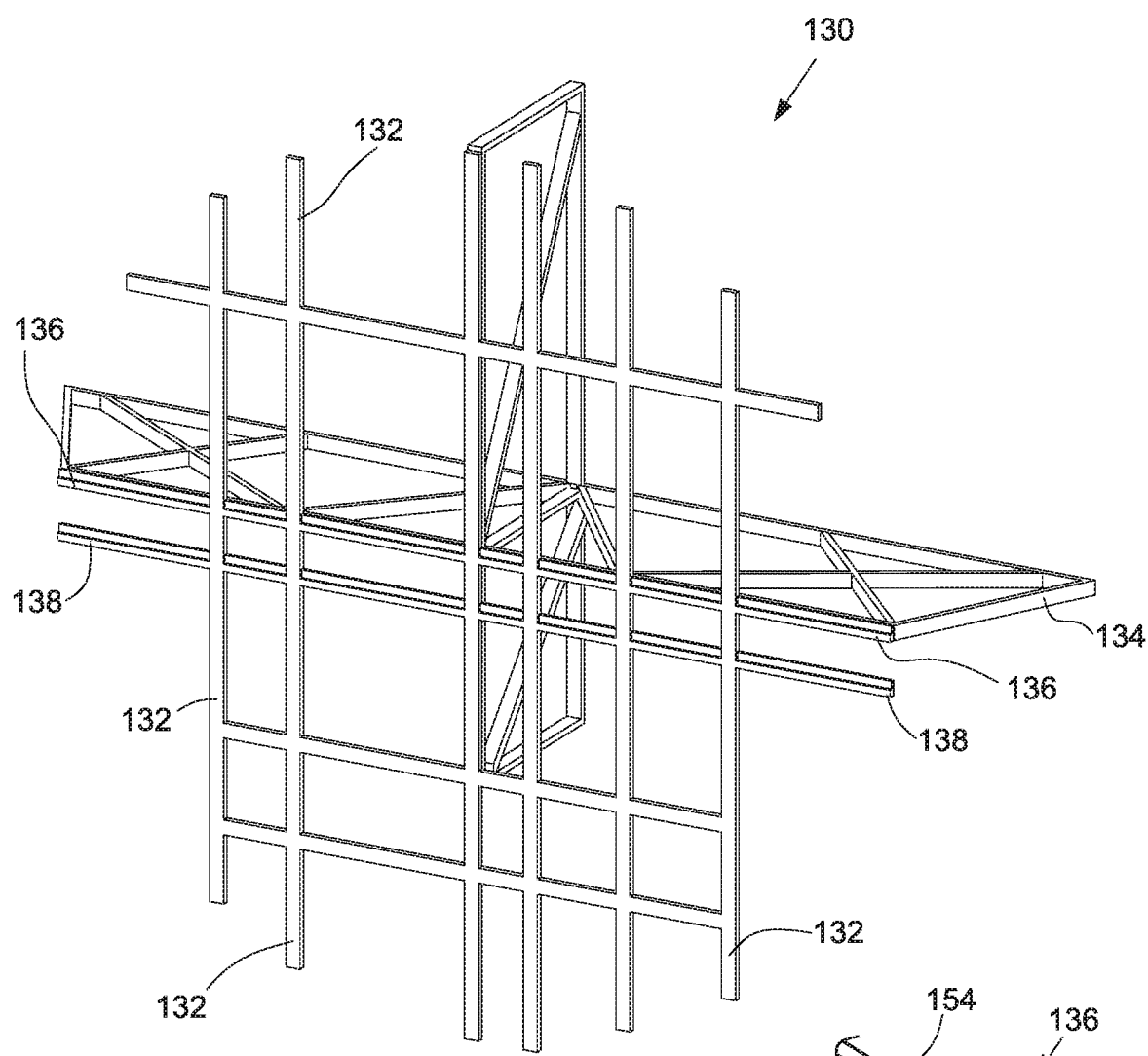
FIG. 12 a perspective view of an extruded sub-structure in accordance with another exemplary embodiment of the present invention.
Figure 13:
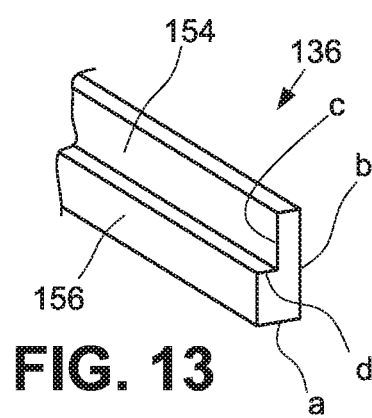
FIG. 13 is an enlarge perspective of a portion of latitudinal beams forming the extruded sub-structure.
Figure 14:
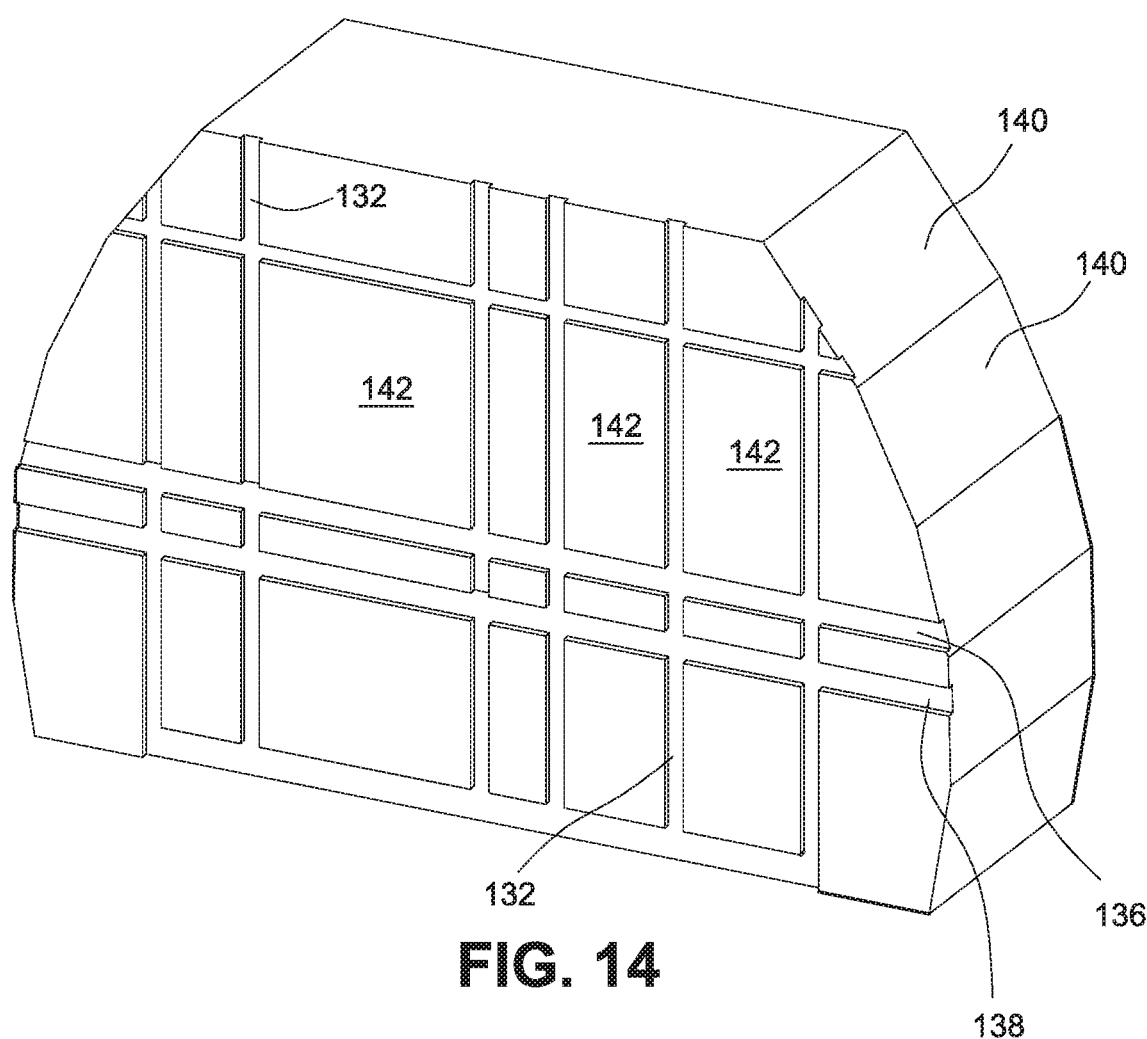
FIG. 14 is a back side view of a galley monument having a plurality of panels supported by the extruded sub-structure.

Referring to FIGS. 12 and 13, an alternative embodiment of the lattice structure is illustrated in form of an extruded lattice structure 130 having a plurality of vertically extending bars 132 and at least a single horizontally extending support frame 134. The horizontally extending support frame 134 may include at least a first latitudinal beam 136 extending across the structure and attached to the vertically extending bars 132 at various points. The lattice structure 130 may also include a second latitudinal beam 138 configured and shaped to provide a locking hanging system for a plurality of panels.

Figure 15:
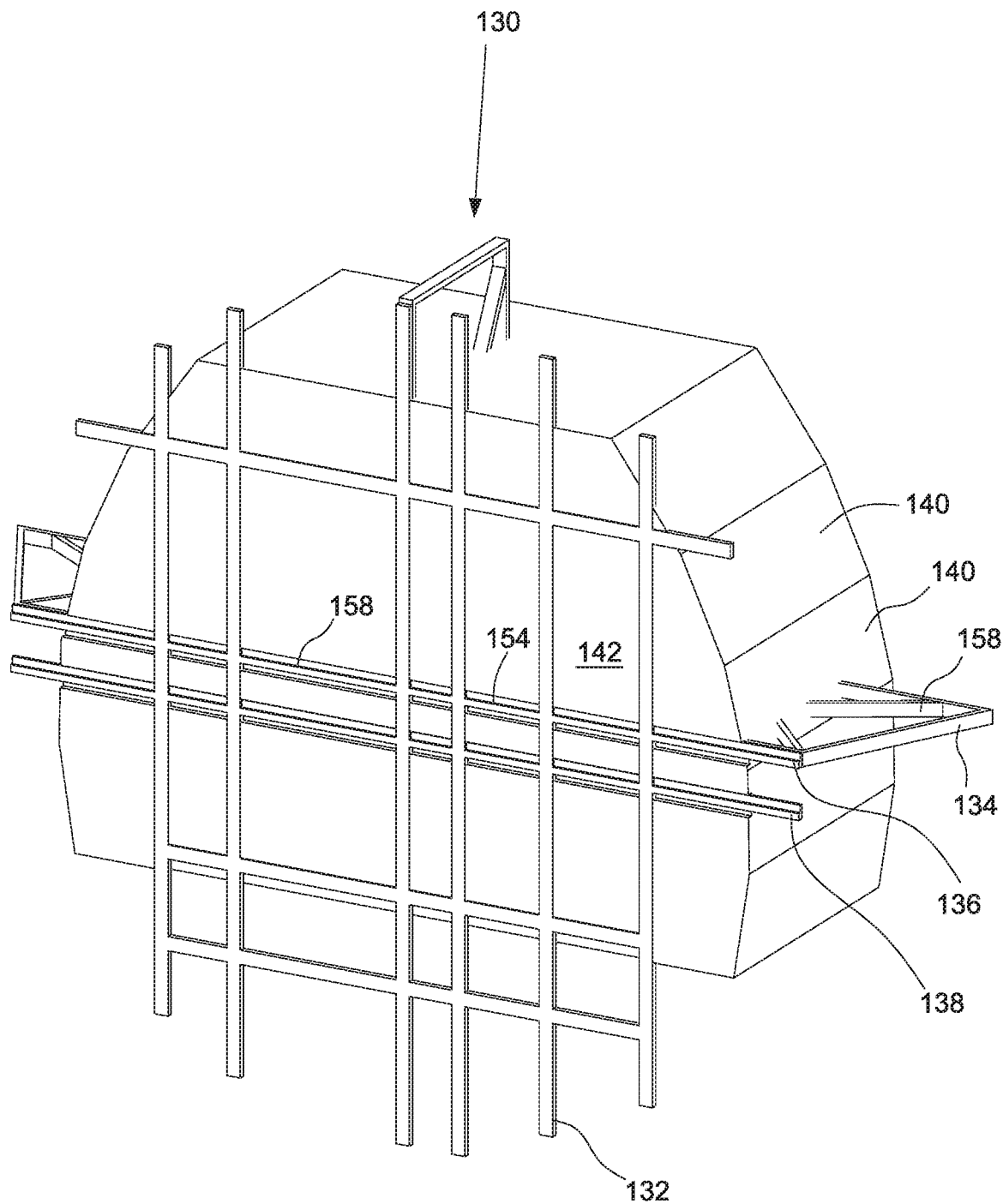
FIG. 15 is perspective view of a galley monument supported in a hanging configuration by the extruded sub-structure.
Figure 16:
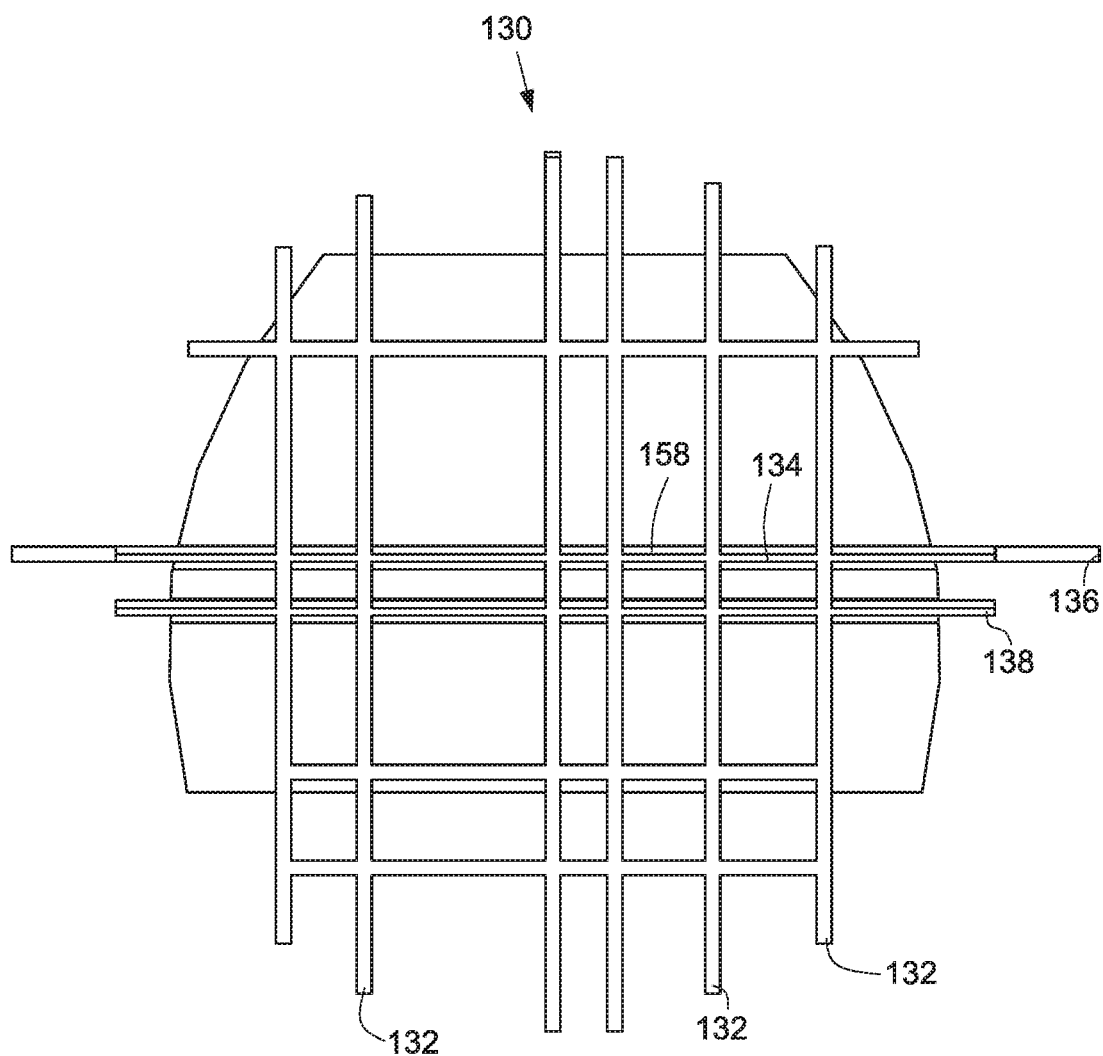
FIG. 16 is a back view of a galley monument supported in a hanging configuration by the extruded sub-structure.

Referring to FIG. 15, the galley may be formed of a plurality of panels 140, and a plurality of back panels 142. The back panels 142 are locked along and secured to the second latitudinal beams 138. As part of the customization of galley or lavatory monuments, the panels may be positioned in various locations to provide varying spaces for the beverage makers, ovens, and food trolleys utilizing the hanging galley configuration as opposed to the conventional galleys. As explained hereinabove, in a conventional galley, if a customer needs to have a customization of the galley, for example, to have three beverage makers and four ovens, the change in design will require changing the whole panels of the galley. This will result in a conventional galley to require recertification the design because all the attachments are done based on different calculations for attaching the galley to the floor, and using different types of connections to the floor based on the type of the configuration of the galley.

Figure 17:
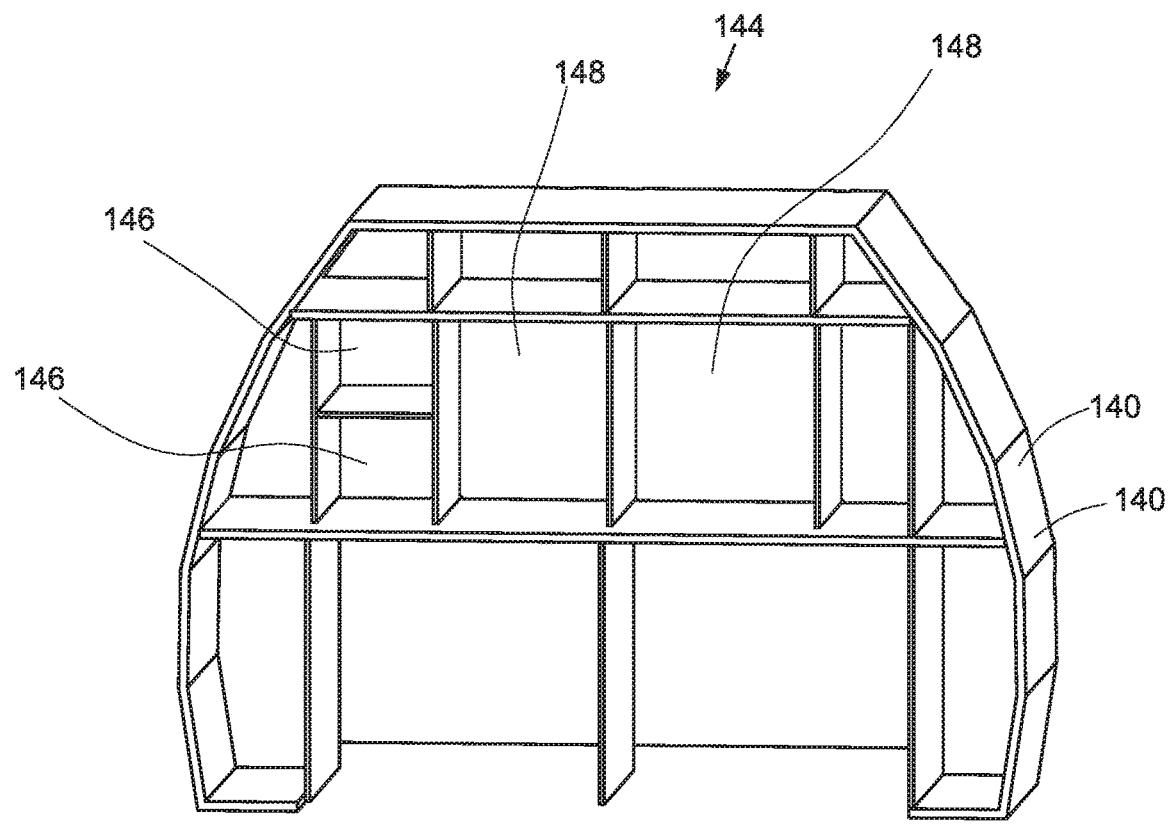
FIG. 17 is an exemplary galley configuration for supporting two beverage makers and including the same number of oven spaces.
Figure 18:
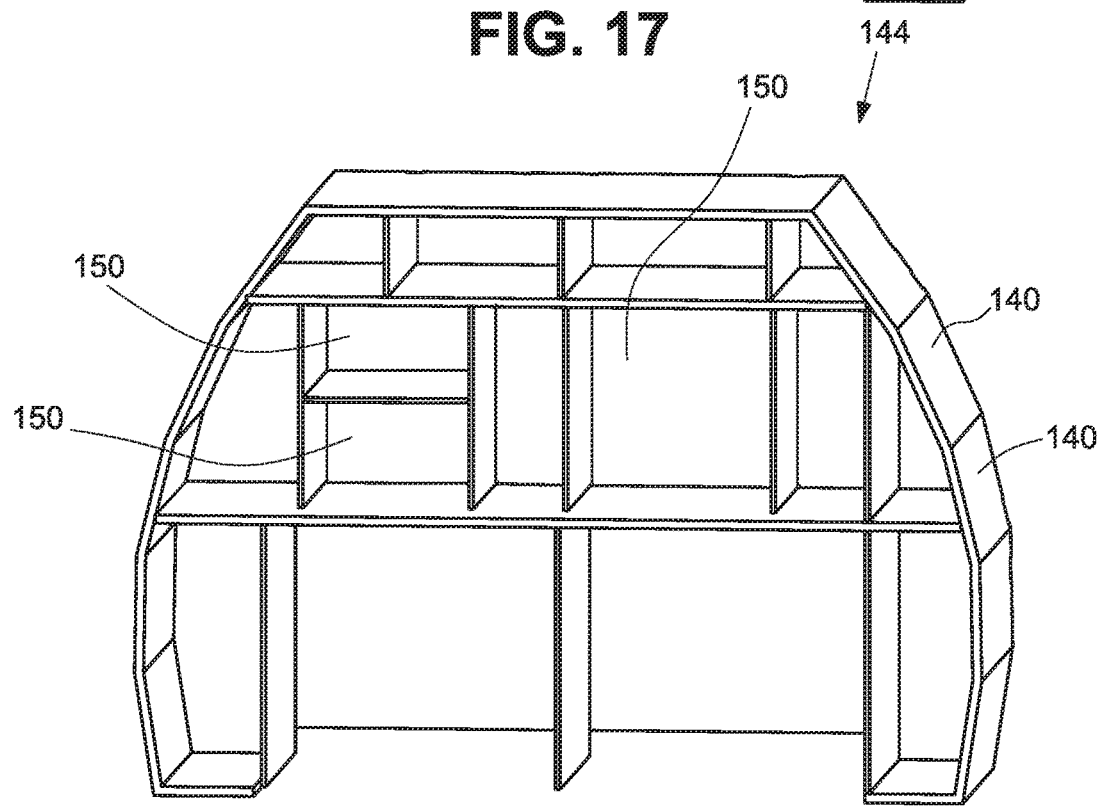
FIG. 18 is an exemplary galley configuration for supporting three beverage makers and space for one oven; and, FIG. 19 is a perspective view of an aircraft illustrating the interior cabin area thereof.

Referring to FIG. 17, an exemplary embodiment of an aft galley 144 is illustrated. In this embodiment, the aft galley includes two spaces 146 for holding a beverage maker, and two spaces 148 for holding an oven. Referring to FIG. 18, the design variation includes three spaces 150 for holding a beverage maker, but the oven space 152 has been reduced to one. The same configuration may be applicable to a galley between two doors of an aircraft, or between cockpit and cabin. This could be applicable to single aisle aircraft or double aisle aircraft. The panels allow you to reconfigure and customize the contents of the galley without changing the connections of the galley to the wall.

Referring back to FIG. 13, the first latitudinal beam 136 includes an L-shaped longitudinal configuration having a vertical portion 154 and extending upwardly and integrally formed with a base portion 156. Each back panel 142 of the locking hanging system may include an elongated peripheral channel which is shaped and configured to receive the vertical portion 154 of the L-shaped first latitudinal beam 136. As an exemplary embodiment, the dimensions of the various sides of latitudinal beam 136 may be as follow: a=20.32 mm, b=50.8 mm, c=26.164 mm, and d=10.16 mm.

The panels 140 or the back panels 142 may be manufactured from carbon fiber or fiberglass. The panels 140 and back panels 142 have enough structural rigidity and strength to replace the lattice sub-structures in the first embodiment with bars. Therefore, the panels are essentially supporting and forming the galley by hanging on the extruded lattice structure 130. The lattice structure 130 may be formed of aluminum, extruded structure as a one-piece structure for supporting the panels to form the galley. The panels are load carrying panels.

The panels 140 of the galley or lavatory monument can be part of the sub-structure themselves. The panels 140 may include reinforcing beams 158 embedded within them to provide additional rigidity for supporting the weight of the monument and its contents.

Referring to FIG. 15, the extruded lattice sub-structure 130 is illustrated as being embedded within the back panels 142 of the galley monument. The extruded lattice sub-structure 130 is an extruded aluminum structure which is used instead of the load carrying lattice wall, but instead having panels that are formed of carbon fiber the load carrying panels. The panels need to be of the material that can support the galley. The new design is related to the panels 140 and back panels 142, instead of the lattice structure, which is of extruded aluminum material, and which can function the same as of the lattice structure.

The panels 140 and back panels 142 are embedded along their peripheral edges by the L-shaped latitudinal beams.

The panels 140 are load carrying with strong enough and good mechanical properties that can support the monument. Some support longitudinal beams may be embedded inside the panels to provide additional rigidity. Each individual panel 140 is a supporting load carrying structure. Since through the design process all the calculations of the CoG are done for the galley monument, the customer can create infinite number of design variations without requiring any recertification. The calculations are required because of the location of the CoG of an equipment, for example, and oven which is heavier than a beverage maker, can shift by changing the design to include more ovens or more beverage makers.

The extruded aluminum lattice structure 130 may be fastened to the cabin wall of the aircraft using fasteners or screws. The hanging the galley configuration will allow a faster production of the galleys by simply configuring the location of the ovens or beverage makers. The conventional monument galleys and lavatories are installed manually by engineers securing them to the floor. The hanging galley configuration may allow automated installation by simply attaching the panels to the extruded lattice structure.

Figure 19:
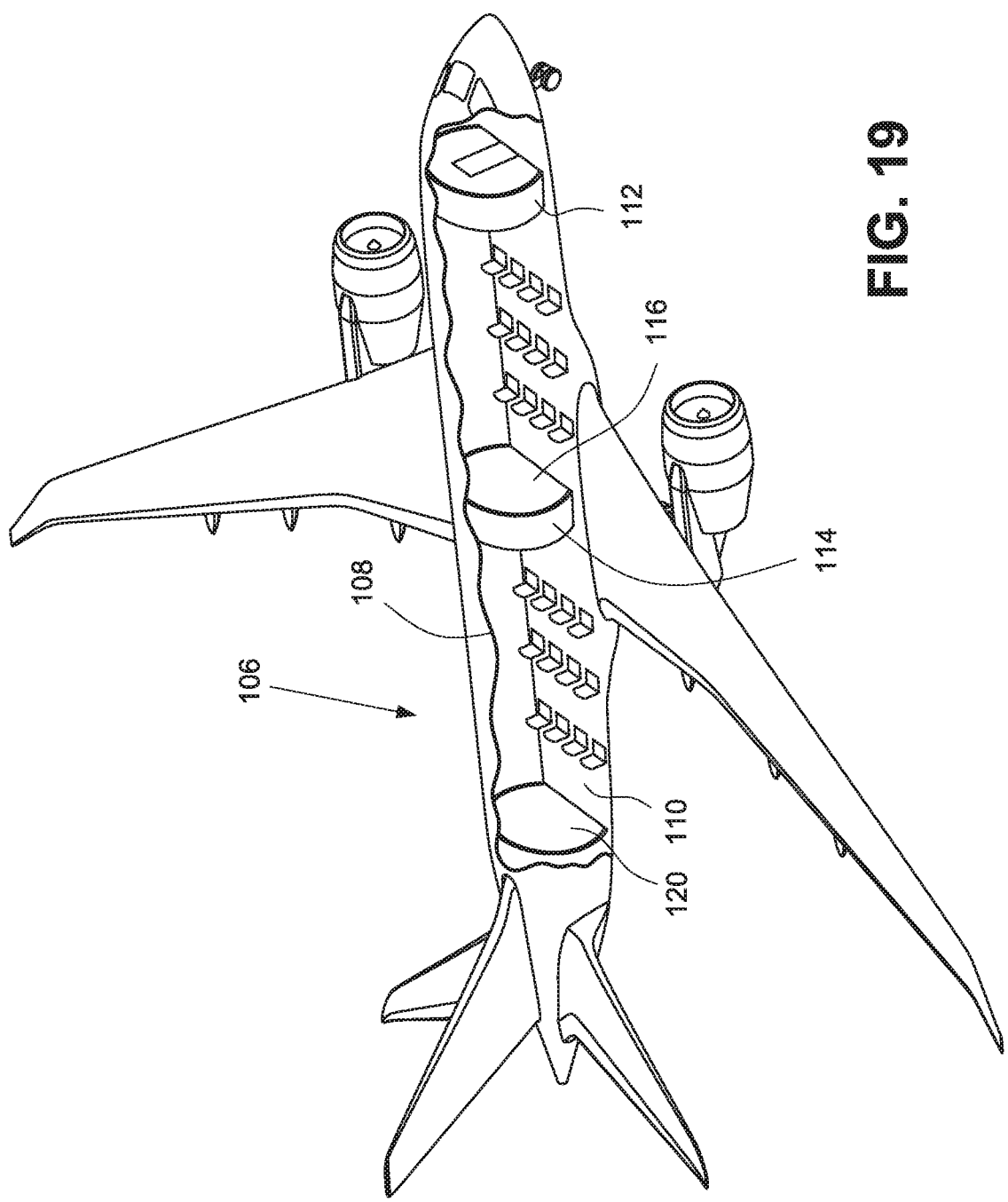

Referring to FIG. 19, is an exemplary single-aisle commercial aircraft 106. The aircraft includes a fuselage 108 bounding an interior cabin area 110 extending in a fore-aft direction from the cockpit to the rear of the aircraft. The aircraft 106 includes, for example, three partition walls each supporting a monument. A first monument 112 is positioned in front of the aircraft cabin area, and may be of any configuration of single lavatory, single galley, or a combination thereof. A second monument 114 is supported by a partition wall 116, which may also be used to separate different cabin area classes (Economy and Business). And, a third monument at the rear of the aircraft may be supported by another partition wall 120 in the rear part of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means "and/or" (either or both). Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft, comprising:
a fuselage bounding a cabin area therewithin,
at least one load carrying partition wall comprising partition wall frame and a lattice structure attached thereto,
the lattice structure being formed from a plurality of support bars interconnected to one another,
a cabin monument,
a cabin floor,
wherein a support structure mounted within the cabin monument,
wherein the support structure is attached to the lattice structure and supports the cabin monument to the at least one load carrying partition wall and supports a substantial weight of the cabin monument, and
wherein the cabin monument extends perpendicular from the lattice structure over the cabin floor.

2. The aircraft of claim 1, wherein the support structure is integrally formed with the cabin monument as a single component.

3. The aircraft of claim 1, wherein the support structure is a separate component attached to an inner portion of the cabin monument.

4. The aircraft of claim 1, further comprising a second load carrying partition wall, and a second cabin monument attached to the second load carrying partition wall.

5. The aircraft of claim 1, wherein the lattice structure is integrally formed.

6. A method to mounting a cabin monument within an aircraft fuselage, the aircraft fuselage comprising a cabin floor, the method comprising:
providing a load carrying partition wall comprising a lattice structure attached to the aircraft fuselage,
providing a cabin monument, wherein the method further comprises:
providing a support structure attached to a portion of the cabin monument, wherein the support structure supports a substantial weight of the cabin monument,
calculating a plurality of attachment mounting points on the support structure,
attaching the monument to the lattice structure by a plurality of fasteners through the attachment mounting points, and
supporting the cabin monument by the support structure against the lattice structure such that the cabin monument extends perpendicular from the lattice structure over the cabin floor.

7. The method of claim 6, wherein the cabin monument is a lavatory.

8. The method of claim 6, wherein the cabin monument is a galley.

9. The method of claim 6, wherein the support structure is integrally formed with the cabin monument as one piece.

10. The method of claim 6, wherein the support structure is a separate component attached to the cabin monument.

* * * * *